US009485096B2

(12) United States Patent
Shrivastava et al.

(10) Patent No.: US 9,485,096 B2
(45) Date of Patent: Nov. 1, 2016

(54) ENCRYPTION / DECRYPTION OF DATA WITH NON-PERSISTENT, NON-SHARED PASSKEY

(71) Applicants: Apurva Shrivastava, Duluth, GA (US); Aditya Shrivastava, Duluth, GA (US)

(72) Inventors: Apurva Shrivastava, Duluth, GA (US); Aditya Shrivastava, Duluth, GA (US)

(*) Notice: Subject to any disclaimer, the term of this patent is extended or adjusted under 35 U.S.C. 154(b) by 0 days.

(21) Appl. No.: 14/173,794

(22) Filed: Feb. 5, 2014

(65) Prior Publication Data

US 2014/0355757 A1 Dec. 4, 2014

Related U.S. Application Data

(60) Provisional application No. 61/849,939, filed on Feb. 6, 2013.

(51) Int. Cl.
*G06F 21/00* (2013.01)
*H04L 9/14* (2006.01)
*H04L 9/08* (2006.01)

(52) U.S. Cl.
CPC ............... *H04L 9/14* (2013.01); *H04L 9/0822* (2013.01); *H04L 9/0863* (2013.01)

(58) Field of Classification Search
CPC ...................................................... H04L 9/14
See application file for complete search history.

(56) References Cited

U.S. PATENT DOCUMENTS

| 5,799,086 A * | 8/1998 | Sudia ............................. 705/76 |
| 6,118,874 A * | 9/2000 | Okamoto et al. ............ 380/282 |
| 6,230,272 B1 * | 5/2001 | Lockhart et al. ................. 726/2 |
| 7,146,009 B2 * | 12/2006 | Andivahis et al. ........... 380/277 |
| 8,316,237 B1 * | 11/2012 | Felsher et al. ................ 713/171 |
| 8,520,855 B1 * | 8/2013 | Kohno et al. ................. 380/277 |
| 2001/0050990 A1 * | 12/2001 | Sudia ............................ 380/286 |
| 2002/0106086 A1 * | 8/2002 | Kamiya ........... G11B 20/00086 380/277 |
| 2003/0110399 A1 * | 6/2003 | Rail ..................... H04L 63/0815 726/5 |
| 2003/0147536 A1 * | 8/2003 | Andivahis et al. ........... 380/277 |
| 2007/0033642 A1 * | 2/2007 | Ganesan et al. ................ 726/10 |
| 2011/0099203 A1 * | 4/2011 | Fastring ........................ 707/783 |
| 2012/0140923 A1 * | 6/2012 | Lee et al. ......................... 380/45 |
| 2013/0045713 A1 * | 2/2013 | Foster ................... H04W 12/06 455/411 |
| 2013/0086642 A1 * | 4/2013 | Resch et al. ...................... 726/4 |

* cited by examiner

*Primary Examiner* — Morshed Mehedi

(57) ABSTRACT

The method herein teaches encrypting a Private Key using a Passkey from an RSA generated private key/public key pair; the encrypted Private Key is split and then the portions are stored in two different databases. To encrypt data a new AES key is created that encrypts the data that is stored in another database. All users have their AES key encrypted using their associated public encryption keys such that the encrypted AES keys are stored in another database. To decrypt data the user enters his PassKey that is used to decrypt a rejoined split private key from portions that were retrieved from their respective databases. Next the encrypted AES key is retrieved and decrypted using the decrypted Private Key. Finally the AES encrypted data is retrieved from a database and decrypted using the decrypted AES key.

13 Claims, 3 Drawing Sheets

Data Decryption Process

ENCRYPTION / DECRYPTION OF DATA WITH NON-PERSISTENT, NON-SHARED PASSKEY

CROSS REFERENCE TO RELATED APPLICATION

The present application claims benefit from U.S. Provisional Patent Application No. 61/849,939 filed on Feb. 6, 2013 and herein incorporated by reference.

FIELD OF THE INVENTION

The present invention relates to information security concepts relating to data that is transferred from one user to another. More particularly, the invention relates to the rearrangement of data using an encryption protocol before transmission by a first user computer and the decryption of the same by another user computer after reception.

BACKGROUND OF THE INVENTION

Encryption is a process by which data is encoded so as to facilitate the secure transmission of the aforementioned from one user to another who decodes the received data. First, the data is encoded using a prearranged encryption protocol such that the information transmitted is rendered unreadable according to normal messaging systems. The scrambled or 'encrypted' data is known as a ciphertext and is generally incomprehensible to the reader. Thus, once the ciphertext is transmitted across an insecure boundary in an electronic network the ciphertext encryption prevents unintended parties from being able to read the sensitive information.

Upon reception of the ciphertext message at the intended end user computer system a decryption process is facilitated by a secure decryption algorithm key possessed by the intended end user. Actuating this decryption algorithm key permits the end user to decipher the message thereby permitting him or her to read the original message as written by the originating user. Various protocols have been suggested in the art such as symmetric key encryption and public key encryption amongst others. In symmetric key encryption both the encryption and decryption keys are the same whilst in the public key encryption the encryption key algorithm is published in order that anyone can create encrypted messages. However, only the end user has access to the decryption key thereby providing a level of security higher than symmetric encryption. A typical example of this system is known as the RSA crypto-system first created in 1977.

However, the prior art has a problem in that Passkeys are typically stored on some permanent memory system thereby permitting them to be retrieved by a hacker or other unauthorized user or even divulged intentionally or unintentionally by the end user.

Accordingly, there needs to be some solution to overcome the aforementioned problems.

SUMMARY OF THE INVENTION

The present invention overcomes the deficiencies of the known art and the problems that remain unsolved by providing embodiments as follows:

A method of creating a Public Key/Private Key pair in an electronic device having a dedicated encryption decryption application comprising the steps of:
  receiving a PassKey entered by a user;
  creating a Public Key/Private Key Pair; and
  encrypting the Private Key using the Passkey.
In another aspect,
  splitting the encrypted Private Key into two portions.
In another aspect,
  storing the first encrypted portion of the Private Key in a first database.
In another aspect,
  storing the second encrypted portion of the Private Key in a second
A data encryption process comprising the steps of:
  receiving data entered by a user;
  generating a random key;
  encrypting data using the random key;
  storing the encrypted data in a database;
  encrypting the random key using a public encryption key;
  storing the public encryption key encrypted random key in a database.
In another aspect,
  repeating the process for a plurality of users thereby creating a plurality of random keys encrypted by the individual users' public encryption keys for storage in the database.
In another aspect,
  wherein the public encryption key further comprises a public encryption key created by a Public Key/Private Key process that produces a Split Private Key that is split into at least two portions.
A method of decrypting encoded data comprising the steps of:
  receiving a user entered PassKey;
  retrieving a first portion of a Split Private Key from a first database; and
  retrieving a second portion of a Split Private Key from a second database.
In another aspect,
  joining the first and second portion of a Split Private Key.
In another aspect,
  decrypting the joined Private Key using the user PassKey resulting in a decrypted user Private Key.
In another aspect,
  retrieving an associated public key encrypted random key;
In another aspect,
  decrypting the associated public key encrypted random key using the decrypted user Private Key.
In another aspect,
  retrieving encoded data from a database.
In another aspect,
  decrypting the encoded data using the decrypted random key.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The following system level flowcharts apply to an electronic computing system transmitting and receiving data information across an electronic communication system from one user to another. Amongst some of the electronic computing systems using this type of process includes but is not limited to: standalone computers, terminal stations, cell phones, smart phones, portable computers, networked computer, servers and similar type of devices. The communication system includes but is not limited to: networks, LAN, WAN, Token Ring, the Internet, Intranet, Telephony systems and similar types of transmission and reception systems.

Figure 1:
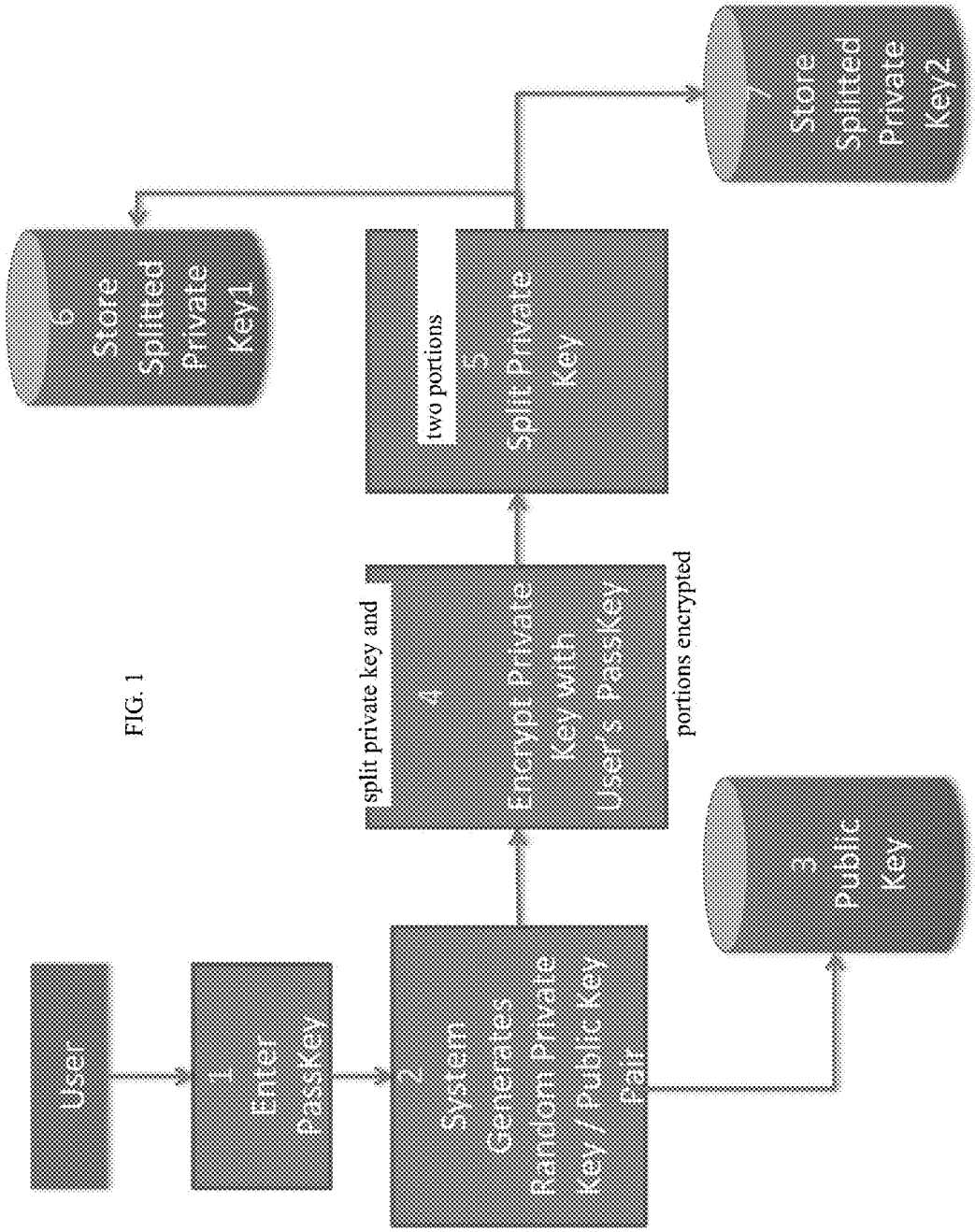
FIG. 1 presents a system flowchart describing the first time a user sets up an encryption protocol according to an embodiment taught herein.

FIG. 1 presents a system flowchart describing the first time a user sets up an encryption protocol according to an embodiment taught herein. It should be understood that the user has an application loaded onto his computing platform that is capable of generating an encryption key and performing the various steps herein described. Thus, a user must first Enter a PassKey 1 into his computer that provides an encryption result. Because of this, the user computer System Generates a Random Private Key/Public Key Pair based on the PassKey using the RSA algorithm; the Public Key is stored in a database 3. The process continues with The Private Key being Encrypted with the User's Passkey 4 and then the result is Split producing a Split Encrypted Private Key 5 having two encrypted portions (Private Key 1 and Private Key 2). Finally, the process proceeds to store the Split Private Key 1 in a database and the Split Private Key 2 in a different database.

Encryption

Figure 2:
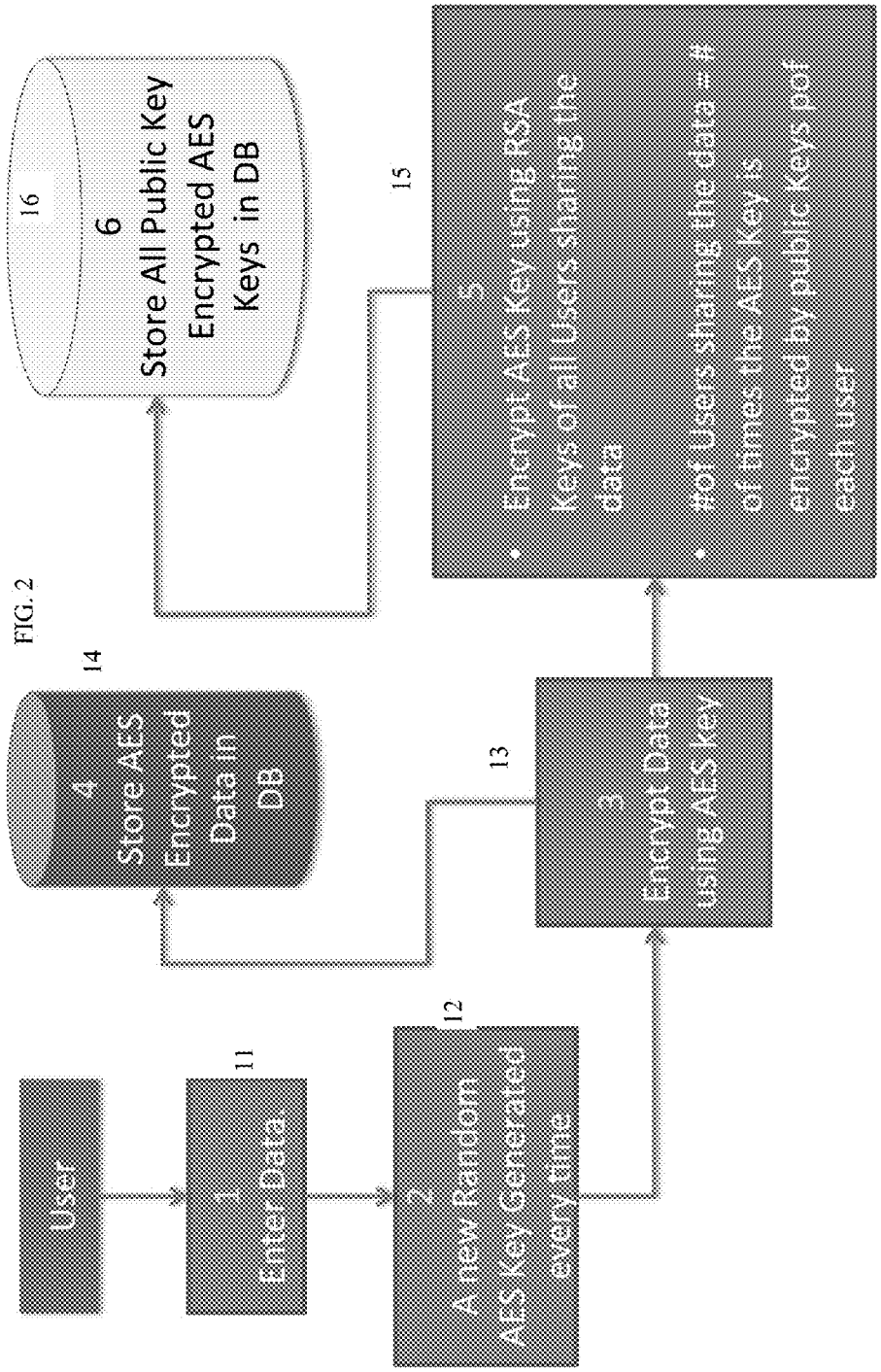
FIG. 2 presents a system flowchart describing the data encryption process according to an embodiment taught herein.

FIG. 2 presents a system flowchart describing the data encryption process according to an embodiment taught herein. When a user wishes to encrypt a message, data set or other data the following sequence of steps are followed in the application process used to create an encrypted item:

1—A User Enters Data 11 to be encrypted in to the application on his electronic device for this purpose;

2—A new random AES (Advanced Encryption Standard) Key is generated 12 by the aforementioned and utilized as follows;

3—The User Entered Data is Encrypted 13 by this new AES Key; whereupon

4—The Encrypted Data 14 is stored in a Database;

5—The new AES Key is encrypted 15 for every user sharing the data; this encryption uses their previously generated Public Encryption Key; thus, it should be understood that the number of users is equivalent to the number of encrypted AES keys; i.e., # of Users=# of Encrypted AES Keys

6—All the Public Key encrypted AES Keys are stored 16 in the Database.

Decryption

Figure 3:
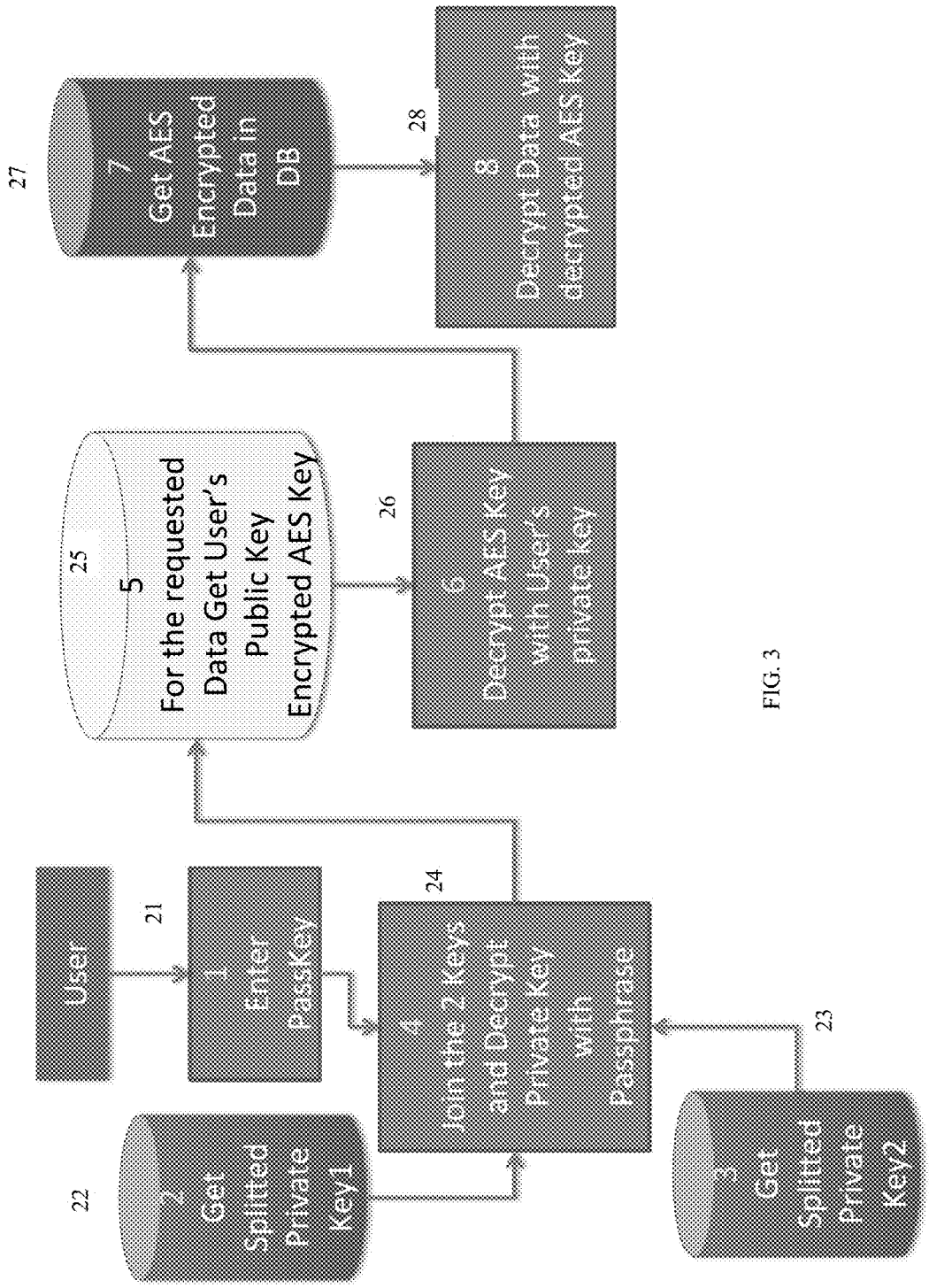
FIG. 3 presents a system flowchart describing the data decryption process according to an embodiment taught herein.

FIG. 3 presents a system flowchart describing the data decryption process according to an embodiment taught herein. When a user wishes to decrypt a message, data set or other data the following sequence of steps are followed in the application process used to create an decrypted item: Thus, Every time a User wants some decrypted data he needs to interact with a computer based application that performs these steps as follows:

1. The user is required to enter 21 the PassKey;

2. The Splitted Private Key 1 is retrieved 22 from database storage by the computer's processor reading it therefrom;

3. The Splitted Private Key 2 is retrieved 23 from database storage by the computer's processor reading it therefrom;

4. The Splitted Private Keys are joined and the resultant Key is decrypted 24 using the User's PassKey; in this fashion the application has now created a decrypted Private Key;

5. For the requested Data, the associated Public Key Encrypted AES Key is retrieved 25 from its database;

6. This AES key is now decrypted 26 using the user's decrypted Private Key in step 4

7. The requested AES encrypted data is retrieved 27 from the database

8. The requested AES encrypted data is decrypted 28 using the decrypted AES key in step 6 above.

Thus, a nested set of encryptions helps preserve the security of information as transmitted across a networked connection. Further, the embodiments herein describe a data encryption and decryption methodology, using asymmetric and symmetric keys, that ultimately allows the user to share data which is encrypted and decrypted using their personal PassKeys. The personal Passkey is a) never shared between users nor stored in any persistent electronic format like a database, a disk, a file or application.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A method of decrypting encoded data in a processor of a computer, wherein the processor is connected to a plurality of storage components including a first storage component and a second storage component, said method comprising the steps of:

receiving a user entered PassKey into the processor, wherein the PassKey was previously created by the user;

retrieving a first portion of a Split Private Key into the processor from a first storage component;

retrieving a second portion of a Split Private Key from a second storage component; and decrypting the encoded data in the process of a computer using the first portion and second portion of the Split Private Key, to facilitate the secure receipt of information;

wherein the PassKey is not stored in a persistent state on any of the plurality of storage components connected to the processor.

2. The method of decrypting encoded data of claim 1, further comprising the step of:

joining the first and second portion of a Split Private Key in the processor.

3. The method of decrypting encoded data of claim 2, further comprising the step of:

decrypting the joined Private Key in the processor using the user PassKey resulting in a decrypted user Private Key.

4. The method of decrypting encoded data of claim 3, further comprising the step of:

retrieving an associated public key encrypted random key in the processor.

5. The method of decrypting encoded data of claim 4, further comprising the step of:

decrypting the associated public key encrypted random key in the processor using the decrypted user Private Key.

6. The method of decrypting encoded data of claim 5, further comprising the step of:

retrieving encoded data from at least one of the plurality of storage components.

7. The method of decrypting encoded data of claim 6, further comprising the step of:

decrypting the encoded data in the processor using the decrypted random key.

8. The method of decrypting encoded data of claim 1, wherein the computer is a server that is remote from the user, wherein the PassKey is received across a network.

9. The method of decrypting encoded data of claim 1, wherein the plurality of storage components are a plurality of databases.

10. The method of decrypting encoded data of claim 1, wherein the processor generates the Private Key/Public Key Pair by using a Rivest-Shamir-Adlemen ("RSA") algorithm, and wherein the PassKey is an input to the RSA algorithm and not an output of the RSA algorithm.

11. The method of decrypting encoded data of claim 1, wherein the user does not share the PassKey with a second user.

12. The method of decrypting encoded data of claim 1, wherein the encoded data was encrypted with an Advanced Encryption Standard ("AES") Key.

13. The method of decrypting encoded data of claim 1, wherein the PassKey is not stored permanently within the processor.

* * * * *